(12) United States Patent
Levisse et al.

(10) Patent No.: US 11,788,423 B2
(45) Date of Patent: Oct. 17, 2023

(54) TURBINE ROTOR WHEEL FOR AN AIRCRAFT TURBOMACHINE

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/781,286

(22) PCT Filed: Dec. 3, 2020

(86) PCT No.: PCT/FR2020/052258
§ 371 (c)(1),
(2) Date: May 31, 2022

(87) PCT Pub. No.: WO2021/116567
PCT Pub. Date: Jun. 17, 2021

(65) Prior Publication Data
US 2022/0412216 A1    Dec. 29, 2022

(30) Foreign Application Priority Data
Dec. 10, 2019 (FR) ...................... 1914015

(51) Int. Cl.
*F01D 5/30* (2006.01)
*F01D 1/26* (2006.01)
(Continued)

(52) U.S. Cl.
CPC .............. *F01D 5/3023* (2013.01); *F01D 1/26* (2013.01); *F01D 5/08* (2013.01); *F01D 5/3053* (2013.01); *F02C 3/067* (2013.01); *F05D 2240/15* (2013.01)

(58) Field of Classification Search
CPC ........ F01D 5/225; F01D 5/3023; F01D 5/303; F01D 5/3038; F01D 5/3046; F01D 5/3053; F05D 2240/15
See application file for complete search history.

(56) References Cited

U.S. PATENT DOCUMENTS 1,345,642 A * 7/1920 Schmidt ................ F01D 5/3053
416/217
2,928,652 A * 3/1960 Shapiro ................ F01D 5/3053
416/221
(Continued)

FOREIGN PATENT DOCUMENTS

EP    2 728 121 A1    5/2014
EP    2 863 016 A1    4/2015
(Continued)

OTHER PUBLICATIONS

English translation of Written Opinion dated Feb. 16, 2021, issued in corresponding International Application No. PCT/FR2020/052258, filed Dec. 3, 2020, 6 pages.
(Continued)

*Primary Examiner* — Christopher R Legendre
(74) *Attorney, Agent, or Firm* — CHRISTENSEN O'CONNOR JOHNSON KINDNESS PLLC

(57) ABSTRACT

A turbine rotor wheel for an aircraft turbomachine includes a rotor disk, an annular shroud extending around the disk, and blades arranged between the disk and the shroud. The root of each of the blades has two tabs configured for attachment to the disk. The tabs are arranged upstream and downstream, respectively, of a wall of the disk, relative to the axis. The tab arranged upstream is engaged in a first recess of the disk and configured to cooperate by abutment with a peripheral edge of the first recess. The tab arranged downstream is engaged in a second recess of the disk and is
(Continued)

configured to cooperate by abutment with a peripheral edge of the second recess.

8 Claims, 10 Drawing Sheets

(51) Int. Cl.
*F02C 3/067* (2006.01)
*F01D 5/08* (2006.01)

(56) References Cited

U.S. PATENT DOCUMENTS

| | | | | | |
|---|---|---|---|---|---|
| 2,944,787 | A | * | 7/1960 | Gingras | F01D 5/3053 416/193 A |
| 3,039,739 | A | * | 6/1962 | Leland | F01D 5/3053 416/221 |
| 3,042,369 | A | * | 7/1962 | Welsh | F01D 5/3053 416/140 |
| 4,541,778 | A | * | 9/1985 | Adams | F01D 11/008 416/193 A |
| 2011/0110786 | A1 | | 5/2011 | Neumann et al. | |
| 2012/0099999 | A1 | | 4/2012 | Bhokardole et al. | |
| 2022/0412216 | A1 | * | 12/2022 | Levisse | F01D 5/3053 |

FOREIGN PATENT DOCUMENTS

| | | | |
|---|---|---|---|
| EP | 3 020 926 A1 | | 5/2016 |
| GB | 190900607 A | * | 1/1909 |
| GB | 191211706 A | * | 10/1912 |
| GB | 621315 A | * | 4/1949 |

OTHER PUBLICATIONS

International Preliminary Report on Patentability dated May 17, 2022, issued in corresponding International Application No. PCT/FR2020/052258, filed Dec. 3, 2020, 8 pages.

International Search Report dated Feb. 16, 2021, issued in corresponding International Application No. PCT/FR2020/052258, filed Dec. 3, 2020, 6 pages.

Written Opinion dated Feb. 16, 2021, issued in corresponding International Application No. PCT/FR2020/052258, filed Dec. 3, 2020, 7 pages.

* cited by examiner

TURBINE ROTOR WHEEL FOR AN AIRCRAFT TURBOMACHINE

TECHNICAL FIELD OF THE INVENTION

The present invention relates to a turbine rotor wheel, in particular a counter-rotating one, for an aircraft turbomachine.

TECHNICAL BACKGROUND

Typically, an aircraft turbomachine comprises, from upstream to downstream in the flow direction of the gases, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and fuel consumption point of view, it is advantageous to maximize the rotational speed of the low-pressure turbine as this allows to obtain a better efficiency of the turbine. However, increasing the rotational speed of the turbine implies increasing the centrifugal forces it undergoes, and therefore greatly complicates its design.

One suggestion for increasing the efficiency of a turbine without increasing its rotational speed consists in using a counter-rotating turbine. The low-pressure turbine is then replaced by a two-rotor turbine a first rotor of which is configured to rotate in a first rotational direction and is connected to a first turbine shaft, and a second rotor is configured to rotate in an opposite direction of rotation and is connected to a second turbine shaft. The first rotor comprises turbine wheels interposed between turbine wheels of the second rotor.

A low-pressure turbine can have a rotational speed at take-off of about 4,000 rpm in a conventional architecture where the turbine drives the fan directly or a rotational speed at take-off of about 10,000 rpm in an architecture where the turbine drives the fan by means of a reduction gear. Its replacement by a counter-rotating turbine whose rotors turn respectively at speeds at take-off of the order of 3,000 and 7,000 revolutions per minute allows to have a relative speed of 10,000 revolutions per minute (3000+7000) while having an absolute speed in a low range of the aforementioned speed interval.

This counter-rotating turbine comprises a slow rotor and a fast rotor, the slow rotor driving the fan and the fast rotor meshing with a mechanical reduction gear with an epicyclic gear train of the planetary type whose input and output are counter-rotating (rotating ring gear, stationary planet carrier, rotating sun gear).

The reduction gear couples the fast rotor and the slow rotor, allowing thus a power transfer from the fast rotor towards the slow rotor. The higher efficiencies of a high-speed turbine are achieved by transferring a large portion of the power from the turbine towards the fan, without transiting through a reduction gear but through a shaft.

This architecture is complex because of its mechanical integration. One problem is related to the transmission of torque between the slow rotor and the fan. This torque transmission is usually carried out by means of the last stage or of the last wheel of the slow rotor (i.e. the most downstream) directly to a downstream end of a turbine shaft whose upstream end is connected to the fan.

One solution to this problem consists in carrying out the torque transmission wheel in one part, this wheel being attached to the downstream end of the turbine shaft. Although the torque transmission is ensured here, this solution is not satisfactory because the wheel is subjected in operation to operating temperatures that cause significant thermal gradients in the part, which can deform it and cause it to lose its centring in relation to its axis of rotation. These thermal gradients are also likely to cause cracks and fissures to appear, and there is no provision for ensuring a retaining of a piece of the part after it has broken. This piece can therefore escape into the turbine duct and cause significant damage to the engine.

In particular, the invention is intended to provide a simple, effective and economical solution to at least some of the above problems.

It is not feasible for such turbine wheels to use conventional designs such as those in the documents EP-2 728 121-A2 or US-2011/110786-A1 comprising vanes retained in place by dovetails or tabs received in gorges formed in the thickness of the disc, as these designs are too bulky axially.

SUMMARY OF THE INVENTION

The invention proposes a turbine rotor wheel, in particular a counter-rotating one, for an aircraft turbomachine, comprising:
  a rotor disc extending around an axis X,
  an annular shroud extending about said axis X and said disc, and
  vanes arranged between said disc and said shroud and comprising roots attached to said disc and summits attached to said shroud,
  characterised in that the root of each of the vanes comprises two tabs for attachment to the disc, these tabs being arranged respectively upstream and downstream of a wall of the disc, with respect to said axis, the tab arranged upstream being engaged in a first recess of the disc and being configured to cooperate by abutment with a peripheral edge of this first recess, the tab arranged downstream being engaged in a second recess of the disc and being configured to cooperate by abutment with a peripheral edge of this second recess, said first and second recesses being located on either side of said wall.

The attachment tabs of each vane thus form male (or female) portions engaged in female (or male) portions formed by the recesses of the disc. This male-female engagement of each vane root ensures an optimal torque transmission. The tabs can in fact cooperate by abutment with the peripheral edges of the recesses, which allows to have a multitude of support and torque transmission surfaces. In addition, the configuration of the wheel in several parts (rather than a single one-piece part) is advantageous because it limits the occurrence of large thermal gradients in a single part and thus the risk of deformation and cracking of that part. The assembly and the manufacture of the wheel is relatively easy. Finally, the risk of off-centring of the disc is reduced and the male-female engagement can also allow to limit the risk of breakage and loss of a vane into the turbine duct.

The rotor wheel according to the invention may comprise one or more of the following characteristics, taken alone or in combination with each other:
  said tabs are substantially planar and parallel and extend in planes substantially perpendicular to said axis X,
  said wall comprises an orifice oriented parallel to said axis X and aligned with orifices of said tabs, an attachment element passing through the orifices of the tabs and of the wall; this attachment element can ensure the retention of the vane with respect to the disc;

at least some of the orifices of the tabs and of the wall have an elongated or oblong shape and comprise a longer dimension oriented in a radial direction with respect to said axis X; this shape can allow to ensure the freedom of expansion of the parts during operation;

each of the tabs comprises a first pair of circumferential stops and a second pair of circumferential stops, the first and second pairs being radially spaced from each other, and each of the stops of each pair being adapted to bear on the peripheral edge of the corresponding recess;

the stops of the first pair are at a distance from each other which is different from that between the stops of the second pair;

the first and second recesses each comprise a first radially external portion having a circumferential width or dimension D1 and a radially internal portion having a circumferential width or dimension D2, with D2<D1;

the vanes comprise blades connected to said roots by platforms, these platforms being arranged circumferentially next to each other around said disc;

a thermal shield of annular shape is fitted and attached on an upstream or downstream face of said disc;

said shroud is sectorized and comprises shroud sectors each connected to a summit of one of the vanes, the shroud sectors comprising sectors of an annular flange for attachment to another rotor wheel;

the shield comprises a radially external portion of generally cylindrical or frustoconical shape and surrounded by the platforms of the vanes;

the shield comprises an intermediate portion having a general cross-section shaped like a C defining an annular space in which axial ends of said attachment elements are housed;

the shield comprises a radially internal portion extending substantially perpendicular to said axis X and applied and attached against said disc.

The present invention also relates to a turbomachine with counter-rotating turbine for an aircraft, the turbomachine comprising a counter-rotating turbine having a first rotor configured to rotate in a first direction of rotation and connected to a first turbine shaft, and a second rotor configured to rotate in an opposite direction of rotation and connected to a second turbine shaft, the first rotor comprising turbine wheels interposed between turbine wheels of the second rotor, characterised in that one of the wheels of the second rotor is as defined above and is connected to the second turbine shaft by its disc.

Thus, this wheel can ensure the torque recovery and the radial hold of the second turbine rotor.

Optionally but advantageously, the turbine wheels of the first rotor are connected to each other and to the first shaft internally to the duct, and the turbine wheels of the second rotor are connected externally to the duct and to the second shaft by the disc of the wheel according to the invention.

Preferably the turbomachine is of the type with a single shrouded fan, the first shaft driving this single fan in rotation.

BRIEF DESCRIPTION OF FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
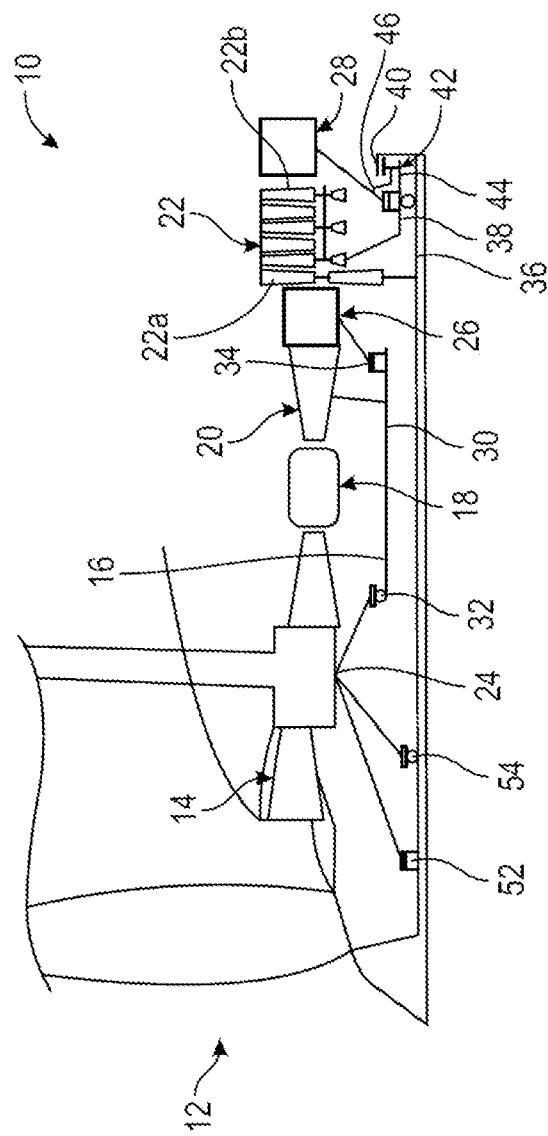
FIG. 1 is a very schematic axial cross-sectional view of an aircraft turbomachine with counter-rotating turbine.

FIG. 1 shows a very schematic representation of a turbomachine 10 with counter-rotating turbine for an aircraft.

This turbomachine 10 comprises from upstream to downstream, in the flow direction of the gases, a fan 12, a low-pressure compressor 14, a high-pressure compressor 16, an annular combustion chamber 18, a high-pressure turbine 20 and a counter-rotating turbine 22.

The reference 24 designates an intermediate casing located between the compressors 14 and 16, and the reference 26 designates a turbine casing (of the TVF type, which is an acronym for Turbine Vane Frame, which designates a turbine casing equipped with arms forming straightener bladings) located between the turbines 20 and 22. Finally, the reference 28 designates an exhaust casing (of the TRF type, an acronym for Turbine Rear Frame which designates the last turbine casing). These casings form the structure of the turbomachine: they support the bearings that guide the shafts in rotation and are linked to the suspensions of the turbomachine.

The rotor of the high-pressure turbine 20 drives in rotation the rotor of the high-pressure compressor 16 via a high-pressure shaft 30, which is centred and guided in rotation by bearings, such as an upstream ball bearing 32 and a downstream roller bearing 34. The bearing 32 is mounted between an upstream end of the shaft 30 and the intermediate casing 24, and the bearing 34 is mounted between a downstream end of the shaft 30 and the turbine casing 26.

The counter-rotating turbine 22 comprises a first rotor 22a having wheels 22aa configured to rotate in a first direction of rotation and connected to a first turbine shaft 36, and a second rotor 22b having wheels 22ba configured to rotate in an opposite direction of rotation and connected to a second turbine shaft 38 and interposed between the wheels 22aa of the rotor 22a.

Each turbine wheel comprises an annular row of vanes, each of which comprises an aerodynamic profile comprising an intrados and an extrados that meet to form a leading edge and a trailing edge of the gases in the turbine duct.

The first shaft 36 drives in rotation the fan 12 and the rotor of the low-pressure compressor 14. This first shaft 36 is furthermore meshed with a ring gear 40 of a mechanical reduction gear 42 with epicyclic gear train of planetary type.

The second shaft 38 is meshed with the sun gear 44 or planetary of the reduction gear 42.

The reduction gear 42 further comprises planet gears meshed respectively with the sun gear 44 and the ring gear 40 and carried by a planet carrier 46 which is attached to the exhaust casing 28.

Each of the casings 26 and 28 generally comprises a central hub, as well as an outer annulus that surrounds the hub and is connected to the latter by a series of arms that are substantially radial to the longitudinal axis of the turbomachine. The central hub of the casing 28 extends around at least one portion of the reduction gear 42.

Figure 2:
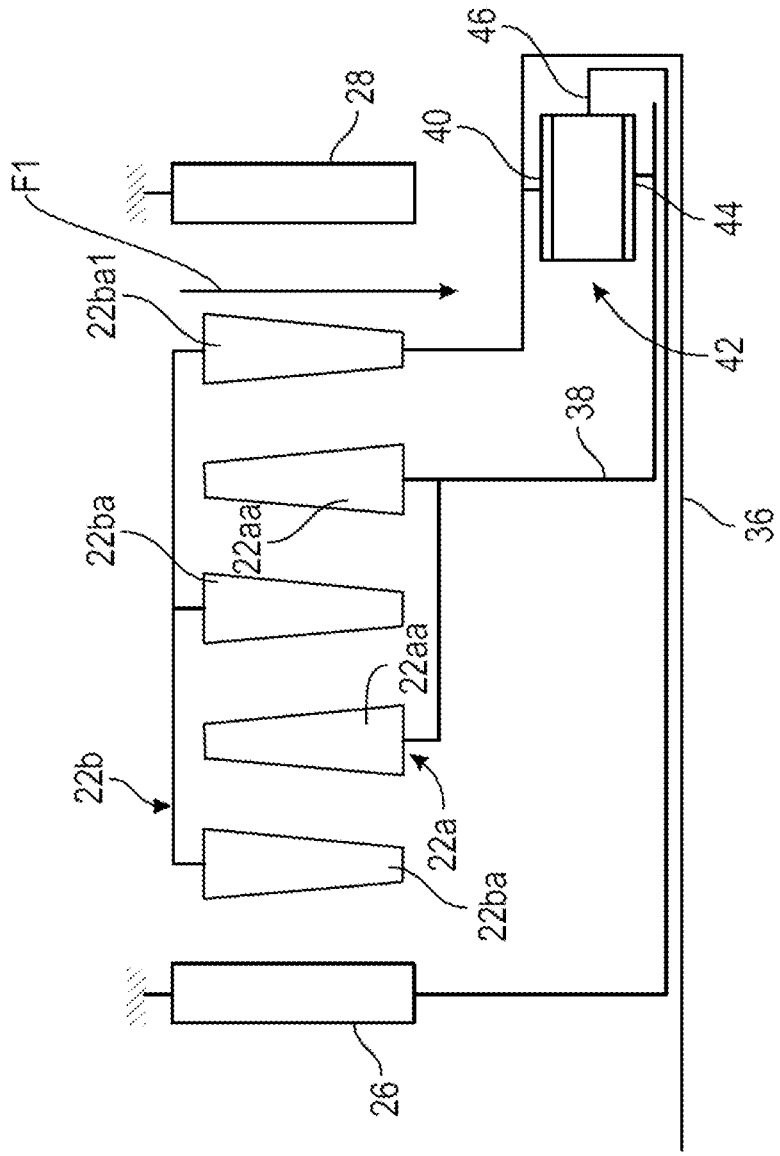
FIG. 2 is a very schematic view of a counter-rotating turbine of an aircraft turbomachine.

FIG. 2 shows on a larger scale the downstream end of a turbomachine and in particular its counter-rotating turbine 22. The elements of this FIG. 2, already described in the foregoing, are designated by the same references. In this embodiment, the planet carrier 46 is attached to the turbine casing 26.

It can be seen in FIG. 2 that the rotor 22a, referred to as fast rotor, is connected to the shaft 38 which is meshed with the sun gear 44 or planetary of the reduction gear 42. The rotor 22b, referred to as slow rotor, is connected to the shaft 36 which meshes with the ring gear 40 of the reduction gear 42 and drives the fan.

The connection of the rotor 22b to the shaft 36 is made by the last stage or the last wheel of the rotor, which must be advantageously designed to transmit the rotational torque (arrow F1) to the shaft 36 while limiting the constraints linked to the thermal gradients during operation and ensuring the radial hold of the second turbine rotor.

The turbine wheels 22aa of the first rotor 22a are connected to each other and to the first shaft 38 internally to the duct. The turbine wheels 22ba of the second rotor 22b are externally connected to the duct and to the second shaft 36 by the disc of the wheel 22ba1 according to the invention.

Figure 3:
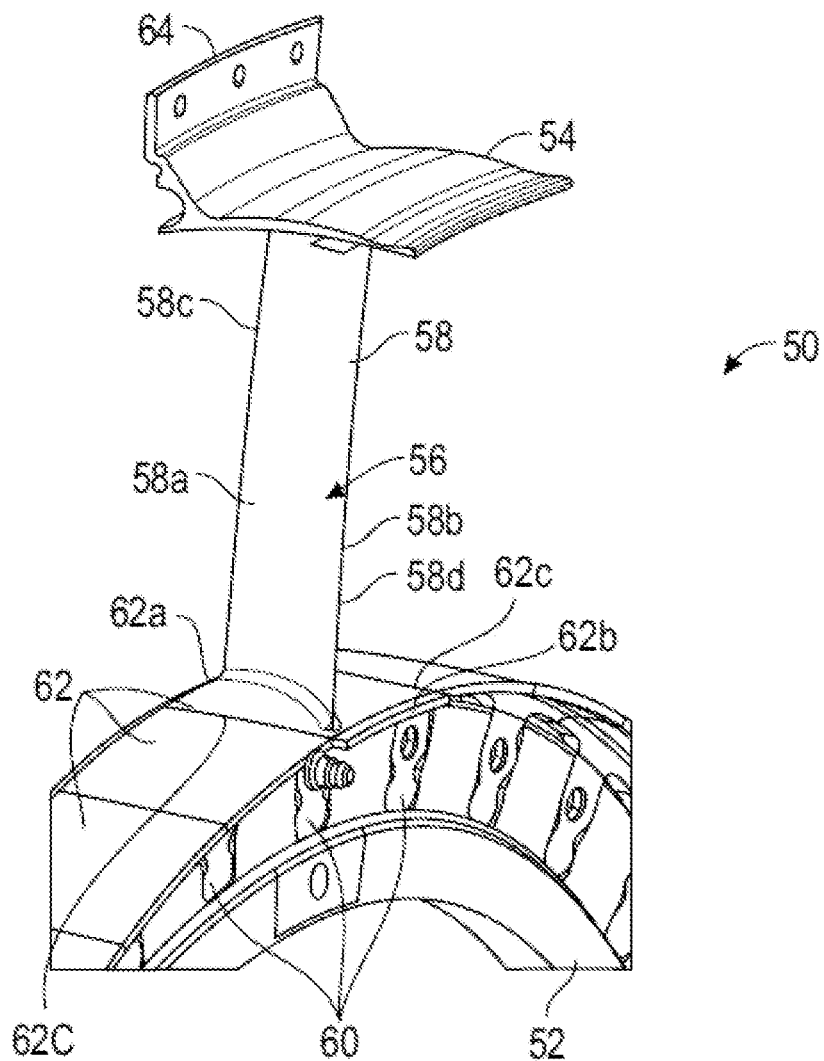
FIG. 3 is a schematic perspective view of a portion of a rotor wheel according to an embodiment of the invention.

The invention proposes a solution to this problem and an embodiment of this invention is shown in FIG. 3 and following.

The solution is a rotor wheel 50 configured to allow the transmission of the torque (F1) while having an optimal service life.

The rotor wheel 50 essentially comprises three portions, namely
a rotor disc 52 extending about an axis X, which is the longitudinal axis of the turbomachine,
an annular shroud 54 extending around the axis X and the disc 52, and
vanes 56 arranged between the disc 52 and the shroud 54.

The vanes 56 extend substantially radially between the disc 52 and the shroud 54 and each comprise an aerodynamically shaped blade 58 that comprises an intrados 58a and an extrados 58b connected by a leading edge 58c and by a trailing edge 58d.

The radially external end of the blade 58 or of the vane 56 is referred to as summit and is here rigidly connected to the shroud 54. This shroud 54 is sectorized and thus comprises several sectors arranged circumferentially next to each other around the axis X.

The radially internal end of the vane 56 comprises a root 60 that is connected to the blade 58 by a platform 62. The platform 62 of a vane 56 is intended to be located above or outside the disc 52 and arranged between two adjacent vane platforms 62, as seen in FIG. 3.

The root 60, the platform 62, the blade 58 and even the shroud sector 54 can be formed in one part. For clarity, in FIG. 3, only one of the vanes 58 is entirely shown. The other vanes of the wheel are partially shown because only their platforms 62 and roots 60 are visible.

As with the shroud sectors 54, the platforms 62 of the vanes 56 are arranged circumferentially next to each other about the disc 52 and the axis X.

Each platform 62 comprises an upstream edge 62a, a downstream edge 62b, and two side edges 62c extending between the edges 62a, 62b. The edges 62c of each platform 62 are located at a short distance from the edges 62c facing the adjacent platforms.

This is also the case for the shroud sectors 54. Each shroud sector 54 comprises an upstream edge 54a, a downstream edge 54b, and two side edges 54c extending between the edges 54a, 54b. The edges 54c of each platform 54 are located at a short distance from the edges 54c facing the adjacent shroud sectors. In addition, the edge 54a of each sector comprises an attachment flange sector 64, the flange sectors 64 of all shroud sectors 54 forming an annular attachment flange, in particular to an adjacent shroud (not shown) integral with another wheel of the turbine rotor 22b. This flange or each flange sector 64 comprises axial orifices for the passage of attachment elements such as screws-nuts.

The root 60 of each vane 56 comprises two tabs 66 for engaging in recesses 68 of the disc 52 and for attaching to this disc.

Figure 7:
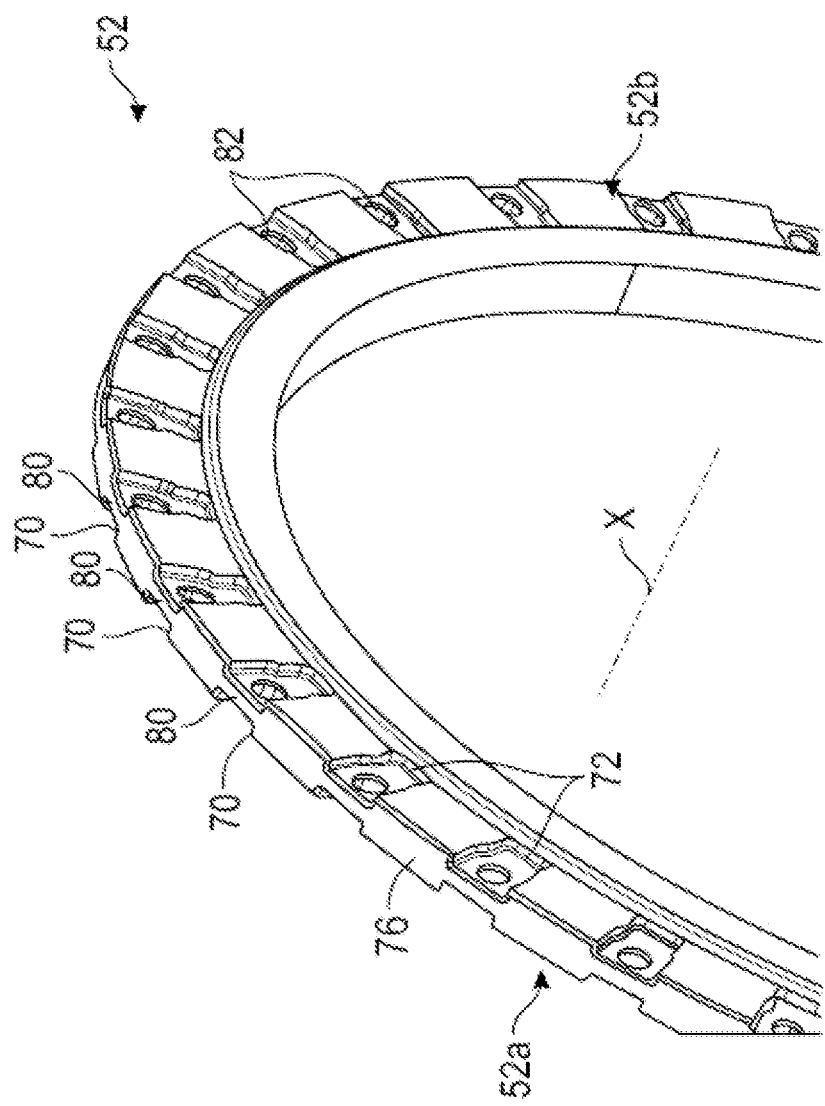
FIG. 7 is a partial schematic perspective view of a disc of the rotor wheel in FIG. 3.
Figure 8:
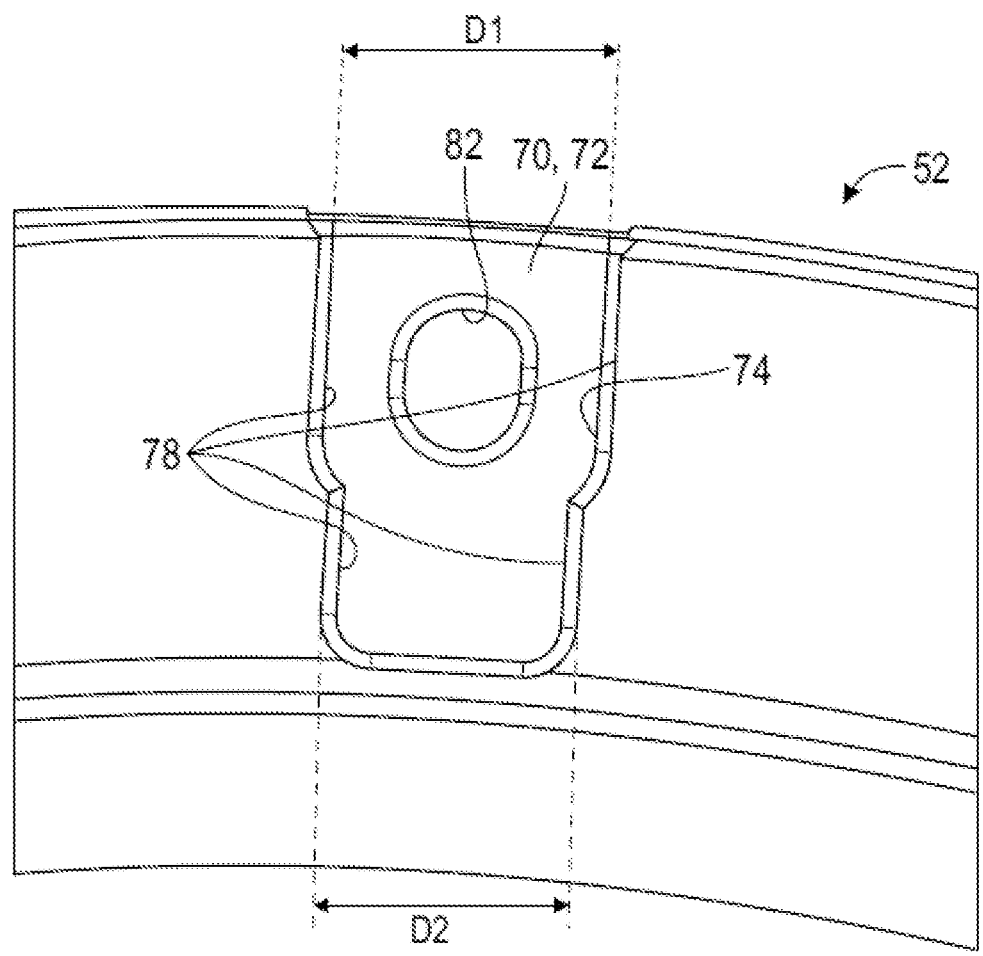
FIG. 8 is a detail view of the disc in FIG. 7.

The disc 52 is shown alone in FIGS. 7 and 8. It has a general annular shape, i.e. its centre is hollow. The connecting means of this disc 52 to the shaft 36, for the transmission of the torque (F1), are not shown.

The roots 60 of the vanes 56 are attached to the external periphery of the disc 52, which comprises an upstream face 52a and a downstream face 52b. First recesses 70 are present on the upstream face 52a and are evenly distributed about the axis X. Second recesses 72 are present on the upstream face 52b and are evenly distributed around the axis X.

The number of recesses 70 is identical to the number of recesses 72, and each of the recesses 72 is located in axial alignment with one of the recesses 70.

In the example shown, the shapes of the recesses are identical. Alternatively, however, it could be different to form an indexing and prevent an improper vane assembly (orientation of the leading edge downstream rather than upstream).

A recess 70, 72 is best seen in FIG. 8 and comprises a general T-shape. Each recess comprises a first radially external portion (relative to the axis X) having a circumferential width or dimension D1 and a radially internal portion having a circumferential width or dimension D2. D2<D1.

Each recess 70, 72 comprises a peripheral edge 74 which is not continuous in the example shown as each recess opens radially outward to an external peripheral edge 76 of the disc. Each of the portions of a recess 70, 72 comprises circumferentially facing abutting side surfaces 78.

The bottom of a recess 70, 72 is formed by a wall 80 of the disc and FIG. 7 allows to show that the recesses are located on either side of these walls 80.

The walls 80 each comprise an axial orifice 82. This orifice 82 preferably has an oblong or elongated shape with the axis of elongation oriented radially with respect to the axis. This means that each orifice 82 has its longest dimension oriented radially.

Figure 4:
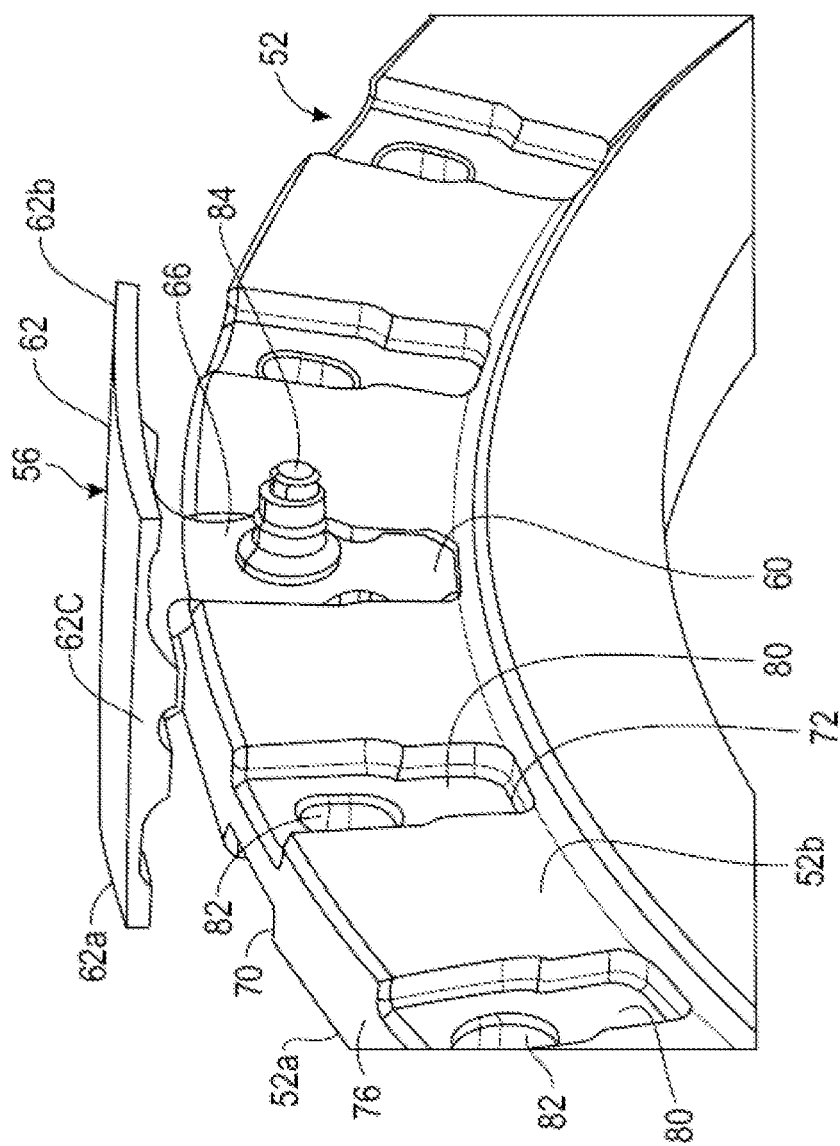
FIG. 4 is a larger scale view of a portion of FIG. 3.
Figure 5:
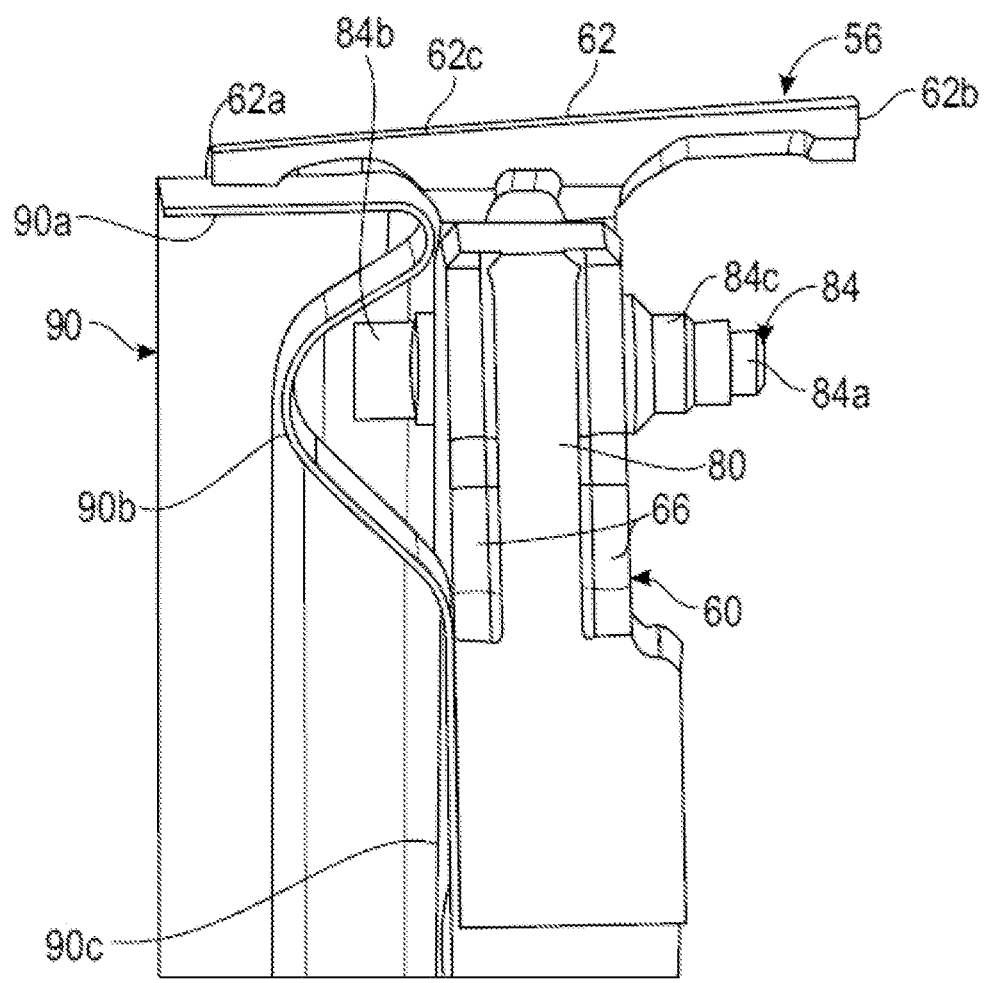
FIG. 5 is a schematic axial cross-sectional view of the rotor wheel in FIG. 3.
Figure 6:
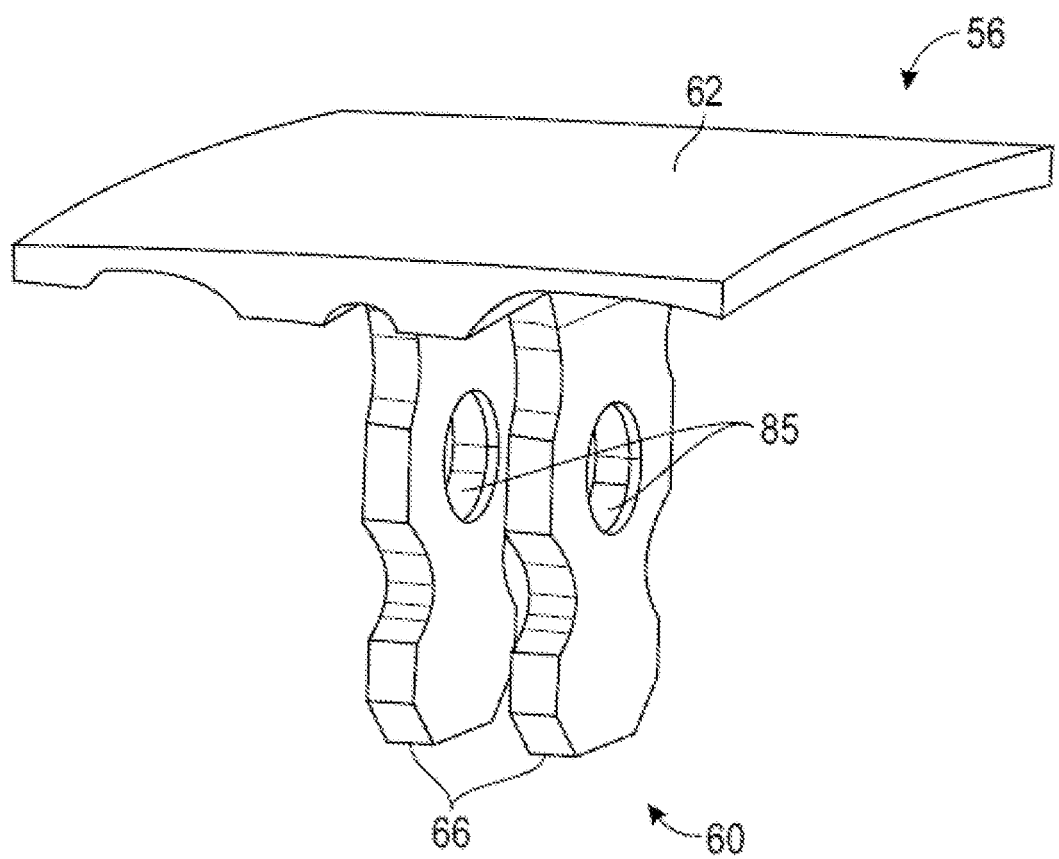
FIG. 6 is a schematic perspective view of a radially internal end of a vane of the rotor wheel of FIG. 3.

As seen in FIGS. 4, 5 and 6, an attachment element 84 such as a bolt passes through this orifice 82 as well as orifices 85 in the tabs 66 of the vane 56. Each orifice 85 has preferably an oblong shape similar to that of the orifice 82. The rod 84a of the bolt extends through the orifices 82, 85 and comprises an end that is connected to a head 84b that bears on one of the tabs 66 of the vane, and an opposite end that receives a nut 84c that bears on the other of the tabs 66 of that vane (see FIG. 5).

The attachment elements 84 pass through the oblong orifices 82, 85 of the tabs 66 and the walls 80 which allow differential thermal expansion between the parts in operation, in particular in the radial direction.

The root 60 of a vane 56, and in particular its radially internal end, is seen alone in FIG. 6.

The tabs 66 are substantially planar and parallel, and extend in planes substantially perpendicular to the axis X. They are spaced apart from each other by a distance that corresponds to the thickness of the wall 80 that is intended to be inserted between the tabs 66.

Figure 9:
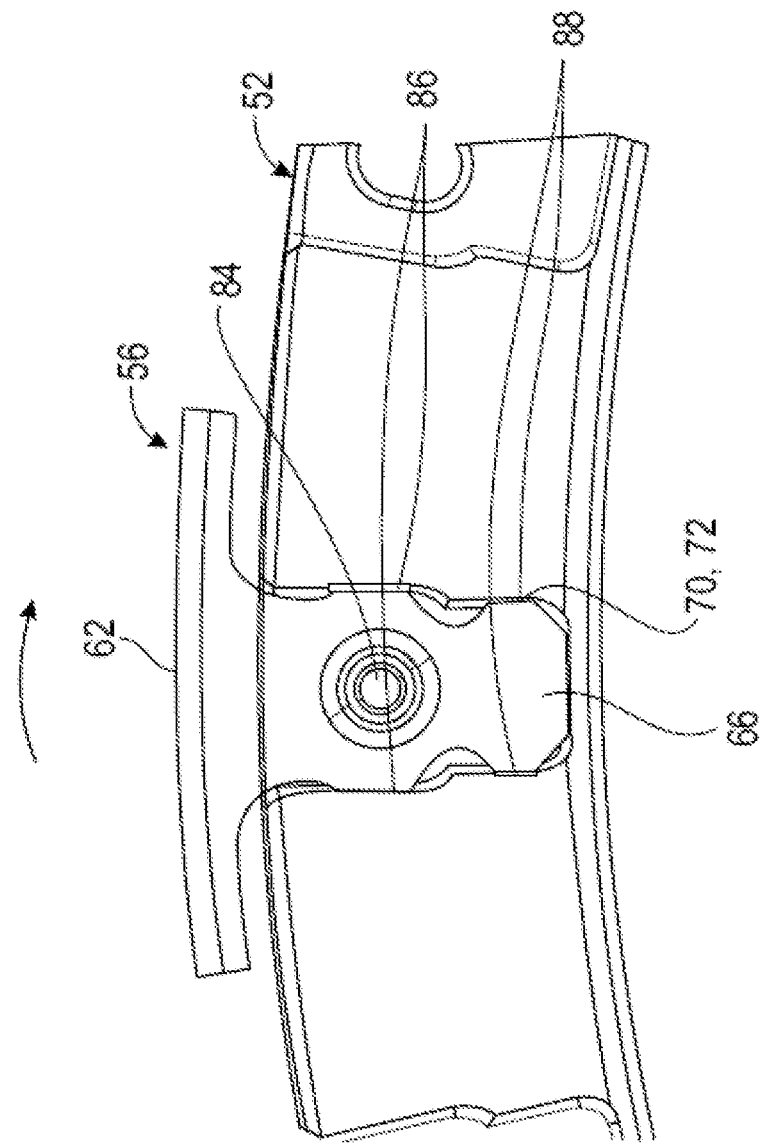
FIG. 9 is a view similar to FIG. 8 and showing a radially internal end of a vane attached to the disc.

Each tab 66 is designed to be engaged by male-female cooperation in a recess 70, 72 and thus comprises a shape nearly complementary to that of the recess (see FIG. 9).

Each tab 66 comprises a general shape in 8 and comprises two portions, respectively external 66a and internal 66b. The external portion 66a is intended to be engaged in the external portion of a recess 70 and comprises the orifice 85 of this tab. This portion 66a comprises a first pair of circumferential stops 86.

The internal portion 66b is intended to be engaged in the internal portion of a recess 70 and does not comprise an orifice. This portion 66b comprises a second pair of circumferential stops 88.

The first and second pairs of stops 86, 88 are radially spaced from each other. The stops 86 are adapted to cooperate by bearing in circumferential direction with the surfaces 78 of the recess 70, 72, and the stops 88 are adapted to cooperate by bearing in circumferential direction with the surfaces 78 of this recess.

The stops 86 are at a distance from each other that is different, and in particular greater in the example shown, than the distance between the stops 88.

A thermal shield 90 with an annular shape is fitted and attached to the upstream face 52a of the disc 52 in the example shown in FIG. 5. This shield 90 covers this face 52a in order to protect it, for example, from thermal radiation coming from the turbine duct.

In the example shown, the shield 90 is formed in one piece and comprises three portions, radially external 90a, intermediate 90b and radially internal 90c, respectively.

The portion 90a is generally cylindrical or frustoconical in shape and is surrounded by the platforms 62 of the vanes 56. The intermediate portion 90b has a cross-section shaped like a C defining an annular space 92 in which axial ends of the bolts such as their heads or nuts are housed. Finally, the portion 90c extends substantially perpendicular to the axis X and is applied and attached against the disc 52.

Figure 10:
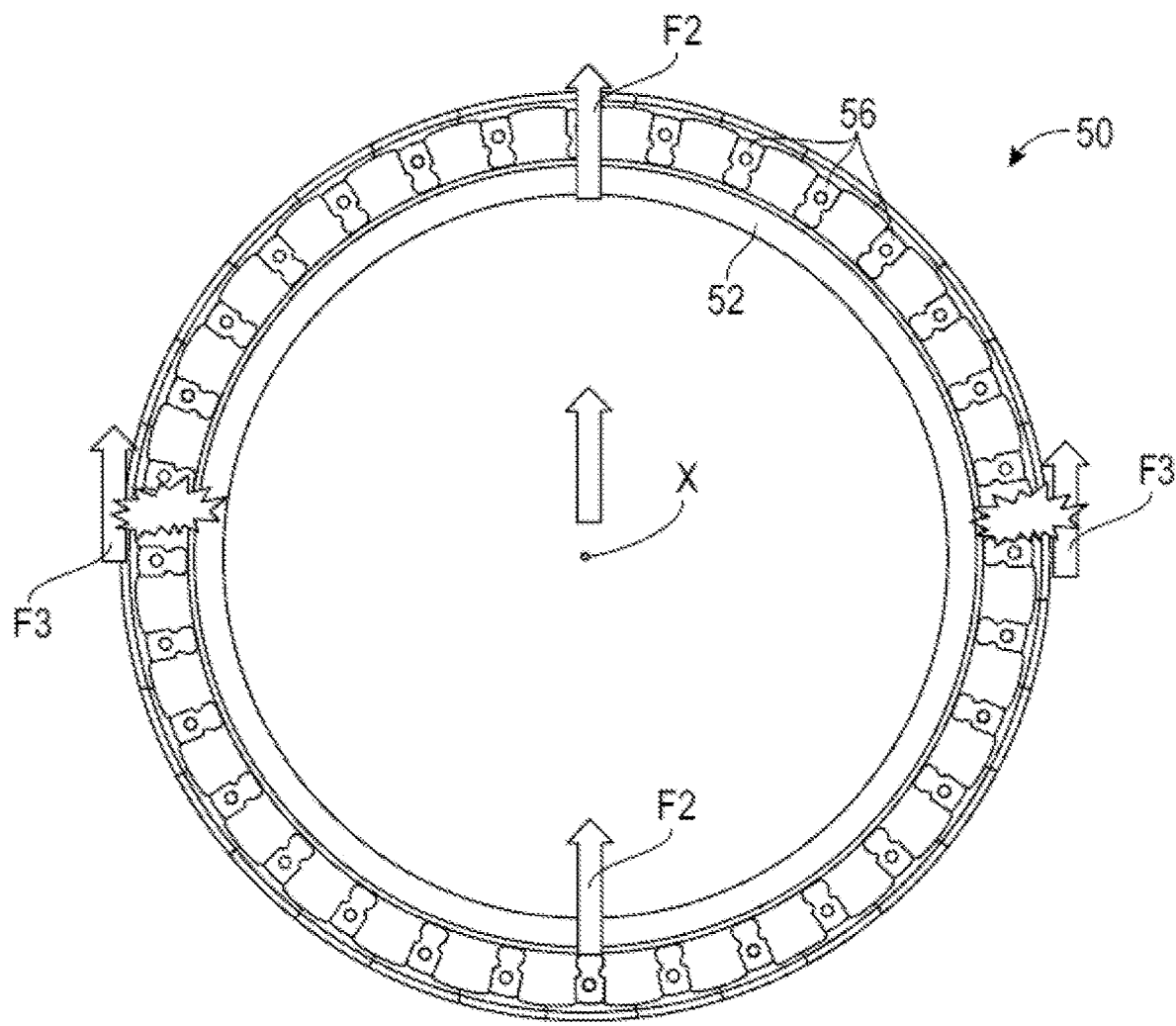
FIG. 10 is a schematic front view of the disc and radially internal ends of the rotor wheel in FIG. 3.

FIG. 10 shows the complete wheel, but does not show the shrouds 54 and the vanes 56 in their entirety.

The wheel can be mounted as follows. The root of each vane is mounted astride the periphery of the disc, on one of the walls 80. For this purpose, each vane is positioned radially outside the disc so that its tabs 66 are located in planes perpendicular to the axis X and therefore parallel to the wall 80, and that the latter is aligned with the inter-tab space. The vane is then moved radially from the outside to the inside so that the tabs engage in a form-fitting manner in the recesses 70, 72 of the disc. The tabs are thus engaged in the recesses starting from the open radially internal ends of these recesses.

When all the vanes are mounted in this way, their platforms 62 and their shroud sectors 54 are wedged together in the circumferential direction. The vanes 56 automatically position themselves by cooperating with the adjacent vanes. This adjustment allows the assembly to withstand centrifugal forces. FIG. 10 shows, for example, that the centrifugal forces F2 applied to two diametrically opposed vanes 56' of the disc are at least partly taken up by circumferential support (arrows F3) of the stops 86, 88 of the vane roots on the surfaces facing their respective recesses. In addition, the circumferential distribution of the stops allows to ensure the centring because a vertical displacement as shown in FIG. 10 will be blocked by the support (F3), which ensures that centring is maintained. In particular, each tab has one of its stops 86 that cooperates by abutment with one of the surfaces 78 of the recess 70, 72, and one of its stops 88 located on the opposite side of this tab, which cooperates by abutment with one of the corresponding surfaces 78 of this recess 70, 72. This is particularly the case for the two diametrically opposed vanes 56'' located at 90° to the vanes 56', as seen in the drawing.

As mentioned above, the rotor wheel according to the invention allows, in particular, the recovery of the rotational torque (F1), the freedom of radial expansion in order not to over-stress the wheel, as well as the centring of the wheel.

The invention claimed is:

1. A turbine rotor wheel for an aircraft turbomachine, comprising:
    a rotor disc extending about an axis X,
    an annular shroud extending about said axis X and said disc, and
    vanes arranged between said disc and said shroud and comprising roots attached to said disc, and summits attached to said shroud,
    wherein the root of each of the vanes comprises two tabs for attachment to the disc, the tabs being arranged respectively upstream and downstream of a wall of the disc, with respect to said axis, each tab arranged upstream being engaged in a first recess of an upstream face of the disc and being configured to cooperate by abutment with a peripheral edge of this first recess, each tab arranged downstream being engaged in a second recess of a downstream face of the disc and being configured to cooperate by abutment with a peripheral edge of this second recess, said first and second recesses being located on two sides of said wall, said wall comprising orifices oriented parallel to said axis X and aligned with orifices of said tabs, attachment elements passing through the orifices of the tabs and of the wall, and at least some of the orifices of the tabs and of the wall have an elongated or oblong shape and comprise a longest dimension oriented in a radial direction with respect to said axis X.

2. The rotor wheel of claim 1, wherein said tabs are planar and parallel with each other, and extend in planes perpendicular to said axis X.

3. The rotor wheel according to claim 1, wherein each of the tabs comprises a first pair of circumferential stops and a second pair of circumferential stops being adapted to bear on the peripheral edge of the corresponding recess, the first and second pairs of circumferential stops being radially spaced from each other.

4. The rotor wheel according to claim 1, wherein the first and second recesses each comprise a first radially external portion having a circumferential width or dimension D1 and a radially internal portion having a circumferential width or dimension D2, wherein D2<D1.

5. The rotor wheel according to claim 1, wherein the vanes comprise blades connected to said roots by platforms, the platforms being arranged circumferentially next to each other around said disc.

6. The rotor wheel according to claim 1, wherein a thermal shield of annular shape is fitted and attached to an upstream or downstream face of said disc.

7. The rotor wheel according to claim 1, wherein said shroud is sectorized and comprises shroud sectors each connected to a summit of one of the vanes, the shroud sectors comprising sectors of an annular flange configured to attach to another rotor wheel.

8. A turbomachine for an aircraft, the turbomachine comprising a counter-rotating turbine having a first rotor configured to rotate in a first direction of rotation and connected to a first turbine shaft, and a second rotor configured to rotate in a second direction opposite to the first direction of rotation and connected to a second turbine shaft, the first rotor comprising turbine wheels interposed between turbine wheels of the second rotor, wherein at least one of the wheels of the second rotor is a wheel according to claim 1 and is connected to the second turbine shaft by its disc.

* * * * *